(12) United States Patent
Hyakutake

(10) Patent No.: US 8,419,294 B2
(45) Date of Patent: Apr. 16, 2013

(54) HOUSING FOR OPTICAL CONNECTOR AND OPTICAL CONNECTOR

(75) Inventor: Yasuhiro Hyakutake, Adachi-ku (JP)

(73) Assignee: Adamant Kogyo Co., Ltd., Tokyo (JP)

( * ) Notice: Subject to any disclaimer, the term of this patent is extended or adjusted under 35 U.S.C. 154(b) by 289 days.

(21) Appl. No.: 12/988,927

(22) PCT Filed: Mar. 25, 2009

(86) PCT No.: PCT/JP2009/055896
§ 371 (c)(1),
(2), (4) Date: Oct. 21, 2010

(87) PCT Pub. No.: WO2009/133738
PCT Pub. Date: Nov. 5, 2009

(65) Prior Publication Data
US 2011/0038584 A1 Feb. 17, 2011

(30) Foreign Application Priority Data
Apr. 28, 2008 (JP) ................................. 2008-117672

(51) Int. Cl.
*G02B 6/36* (2006.01)
*G02B 6/38* (2006.01)

(52) U.S. Cl.
USPC .................. 385/78; 385/60; 385/72

(58) Field of Classification Search ........... 385/60, 385/72, 78
See application file for complete search history.

(56) References Cited

U.S. PATENT DOCUMENTS

| | | | |
|---|---|---|---|
| 5,181,267 A | 1/1993 | Gerace et al. | |
| 5,481,634 A * | 1/1996 | Anderson et al. | 385/78 |
| 5,588,079 A * | 12/1996 | Tanabe et al. | 385/78 |
| 6,325,547 B1 * | 12/2001 | Cammons et al. | 385/76 |
| 6,402,392 B1 * | 6/2002 | Yarita et al. | 385/84 |
| 6,726,370 B2 * | 4/2004 | Shimotsu | 385/78 |
| 7,255,489 B2 * | 8/2007 | Krahenbuhl et al. | 385/88 |

(Continued)

FOREIGN PATENT DOCUMENTS

| | | |
|---|---|---|
| EP | 1 312 956 A1 | 5/2003 |
| JP | A-1-253706 | 10/1989 |

(Continued)

OTHER PUBLICATIONS

Nov. 14, 2011 European Search Report issued in European Patent Application No. 09738675.9.

(Continued)

*Primary Examiner* — Charlie Peng
(74) *Attorney, Agent, or Firm* — Oliff & Berridge, PLC

(57) ABSTRACT

An optical connector is provided to reliably hold a ferrule assembly in a housing to enable it stable optical connection. The optical connector is able to accomplish stable connection without any concern of displacement of an optical connecting end portion of the ferrule, even if the optical connector is subjected to repeated connecting and disconnecting operations. In the optical connector, a ferrule assemble having a polygonal prism-shaped flange is accommodated and held so as to elastically reciprocate in a housing of a cavity which has a polygonal engaging portion to receive and engage the flange of the ferrule assemble. A protrusion is formed at an end part of each engaging wall in the direction of inserting the ferrule assemble to rise toward an insertion opening for the ferrule assemble, and each protruding portion of the protrusion is provided to have each different rising height thereof.

18 Claims, 7 Drawing Sheets

U.S. PATENT DOCUMENTS

2002/0186931 A1    12/2002  Seo et al.
2003/0077045 A1*    4/2003  Fleenor et al. .................. 385/78
2003/0081909 A1*    5/2003  Taira .............................. 385/78
2006/0257075 A1*   11/2006  Terakura ......................... 385/53

FOREIGN PATENT DOCUMENTS

JP      A-2001-147344       5/2001
JP      A-2002-318324      10/2002
JP      B2-3996335         10/2007

OTHER PUBLICATIONS

International Search Report dated Apr. 28, 2009 in International Patent Application No. PCT/JP/2009/055896 (with translation).

* cited by examiner

- 13  Cavity
- 14  Recess
- 14a Engaging portion
- 14b Fitting portion
- 14c Protrusion

HOUSING FOR OPTICAL CONNECTOR AND OPTICAL CONNECTOR

TECHNICAL FIELD

The present invention relates to a housing for an optical connector which holds a ferrule assembly to be used for transmitting and receiving optical signals, and an optical connector for equipping the ferrule assembly to the housing.

BACKGROUND

Conventionally, a ferrule which is used as a connecting end of an optical fiber for transmitting and receiving optical signals in optical communication is usually obtained by forming ceramics consisting primarily of zirconia into a predetermined shape by injection molding or the like, and then baking thereof. The ferrule is provided a through-hole for inserting an optical fiber and is used as a ferrule assembly to hold and fix the optical fiber in the through-hole. The ferrule assembly is widely used in optical connectors that are used to connect optical fibers together and to establish a communication path, or in a semiconductor laser module that is constituted by a semiconductor laser, the optical fiber and the like.

The optical connector is widely used to transmit the optical signals emitted from the semiconductor module or the like to another optical component through the optical fiber, or used as relay members connected between the optical fibers to transmit the optical signals to the optical component placed at a far distant location. The optical connector in this type is a preferred connection configuration that opposite ferrule ends each other are accurately and closely contacted therebetween and axis lines of the ferrules (specifically, axis lines of cores of the ferrules) are aligned each other to efficiently transmit light from one optical fiber to the other optical fiber. For the optical connectors, stability of assembling thereof at an on-site of connection and protection of connecting portion are required, and further, in order to minimize connection loss when the optical connectors are mutually connected, it is desirable to accurately align the cores of the optical fibers, and manufacturing error is required to be eliminated as much as possible. It is specified that the axis lines of the fiber cores must be aligned within a range of connection error of μm order when the optical fibers are connected together, so that not only a high degree of accuracy is required for shapes and dimensions of components constituting the optical connector which becomes the connection ends, but also the utmost attention must be paid to assembling the optical connector.

A communication path is established by inserting the optical connector described above into an opening of a jack socket disposed on a panel such as a wall. When the optical connector is inserted into the opening of the jack socket, a latch formed integrally with a housing of the optical connector is interlocked in the opening of the jack socket and held in order not to fall easily. In addition, there are many situations to be used the optical connectors which are oppositely connected in an adapter housing to extend the optical fiber.

An example of the optical connector having the above-described configuration is disclosed, for example, in the Japanese Patent No. 3996335 of Patent Document 1. In a conventional optical connector 50 shown in FIGS. 8 and 9, a housing 51 which has a rectangular outer shape and is cylindrically formed a main body, and a cavity 52 is formed in the housing. A latch 53 is integrally provided on the housing 51, and the housing 51 is held by interlocking, engaging the latch in the opening of the jack socket fitted to a panel or the like. A ferrule assembly 54 which has a ferrule 55 to establish a communication path is accommodated in the cavity 52. A compression coil spring 56 is fitted around the ferrule assembly 54, and the ferrule assembly is retained in the cavity so as to be elastically advanced or retracted by an elastic resilient force of the compression coil spring 56, and is resiliently connected to another opposite ferrule (not shown), and a communication path is established. In the drawings, numeral 61 denotes a dust cap for protecting the ferrule from dust, dirt, and stains.

As specifically shown in FIG. 9, the ferrule assembly 54 has the ferrule 55 and a holder 57 which holds it, and the holder 57 has a guide sleeve 57a to guide the compression coil spring 56, and a flange 57b formed to a hexagonal column shape to be urged by the compression coil spring 56. A truncated cone shaped guide portion 57c which is continued to the flange 57b is formed in the front portion where the ferrule is fitted.

And, the ferrule assembly 54 is accommodated in the housing 51 in a state that the guide sleeve 57a is supported by an insertion 58, and an optical connection end of the ferrule 55 is projected toward an opening 51b of one end of the housing 51. At this time, the holder 57 of the ferrule assembly 54 is fitted into a recess 51a and a recess 51d which have shapes which have corresponding to the holder 57, and as shown in FIG. 8, an opening 51c of the other end is closed by a sealing member so that the projection position of the ferrule 55 is established. By the sealing by the sealing member 60, therefore, a front end of a trigger lever 60a projected from the sealing member 60 is positioned above the latch 53 of the housing 51. By pressing the trigger lever 60a downward, the latch 53 opposite thereto descends resistively against an elastic force, so that an interlock of the optical connector 50 inserted into an opening of a jack socket or the like is released and is able to be pulled out therefrom.

Patent Document 1: Japanese Patent No. 3996335

DISCLOSURE OF THE INVENTION

Problems to be Solved by the Invention

A ferrule and an optical connector are precisely manufactured to achieve accurate optical connection. And as shown in FIG. 9, a recess 51d which has a hexagonal shape which is provided so as to correspond to the shape of the flange 57b is provided in the cavity 52, and the ferrule assembly 54 is normally urged by the compression coil spring 56 to add an appropriate pressing force to the connection end. Therefore, the flange 57b is accurately and closely engaged with the recess 51d by the pressing force of the compression coil spring 56, and the ferrule assembly 54 is mounted in the cavity 52 of the housing 51, then an appropriate communication path to an end of the other side to be connected is established to perform high-quality signal transmission.

However, when the ferrule assembly 54 is accommodated in the cavity 52 through the manufacturing process to assemble the optical connector, there may be a case that, as shown in FIG. 10, the flange 57b which has a hexagonal column shape is not closely engaged with the recess 51d and the flange is fixed by the urging force of the compression coil spring 56. Also, when the optical connector is repeatedly inserted into and pulled out from a jack socket, or repeatedly connected to and removed from an adapter for relay, there may be a case that the ferrule assembly 54 is fixed in the incomplete state shown in FIG. 10. When an optical connection operation is carried out by using the optical connector in which the ferrule assembly 54 is held in such an incomplete state, it is impossible to carry out accurate transmission of optical signals, and long working hours may be required to conduct operation without knowing the cause of the connection failure. Moreover, even though precision work is performed on components of the optical connector, actually subtle and serious eccentricity may occur in the optical connection. Therefore, after assembling the optical connector, it is adjusted that the engagement between the flange 57b and the recess 51d is released once, and the ferrule assembly 54 is rotated, then the flange 57b and the recess 51d are engaged with each other again at a position that an condition of an optimum optical connection is obtained. However, also in such case, there is a risk that the flange 57b is incompletely engaged with the recess 51d.

In view of the above conventional problems, the present invention provides a housing for an optical connector and an optical connector which are possessed a reliability of assemblage thereof, and are easy repeatedly to attach and remove the optical connector, and have high connection reliability as the optical connector.

Means for Solving the Problems

The subject matter of the present invention is defined by:

(1) a housing for an optical connector, comprising a cavity to accommodate and hold a ferrule assembly having a polygonal prism-shape flange and to hold the ferrule assembly to be capable of elastically advancing and retracting thereof, the housing characterized by comprising, a polygonal engaging portion provided in the cavity to insert and engage the flange of the ferrule assembly, and a protrusion provided at an end side of each engaging wall which forms the engaging portion in a direction of inserting the ferrule assembly therein to rise in a direction of an opening for inserting the ferrule assembly, wherein each protruding portion of the protrusion is provided to have different rising height each other;

(2) the housing for an optical connector according to the above recited item (1), wherein the each protruding portion rises in a state of a curved surface;

(3) the housing for an optical connector according to the above recited item (1), wherein the each protruding portion rises to form a curved surface having the same curvature radius;

(4) the housing for an optical connector according to the above recited item (1) or (2), wherein the height of the protruding portion which is adjacent to one another is lowered consecutively; and (5) an optical connector characterized in that a ferrule assembly is held in a housing by fitting and engaging a flange of the ferrule assembly with the engaging portion of the housing for the optical connector according to any of the above recited items (1) to (4).

Effects of the Invention

According to the optical connector of the present invention, the ferrule assembly is rotatively moved around the axis thereof and the flange is always reliably and closely engaged with the recess which has a shape corresponding to the shape of the flange so that the ferrule assembly is smoothly accommodated in the cavity in a manufacturing process for assembling the connector, and further the ferrule assembly is held by a stable urging force of the spring, therefore, the reliability is increased at the time of assembling the connector, and there is no risk of decreasing accuracy of connection even when the connector is repeatedly fitted and removed.

Figure 1:
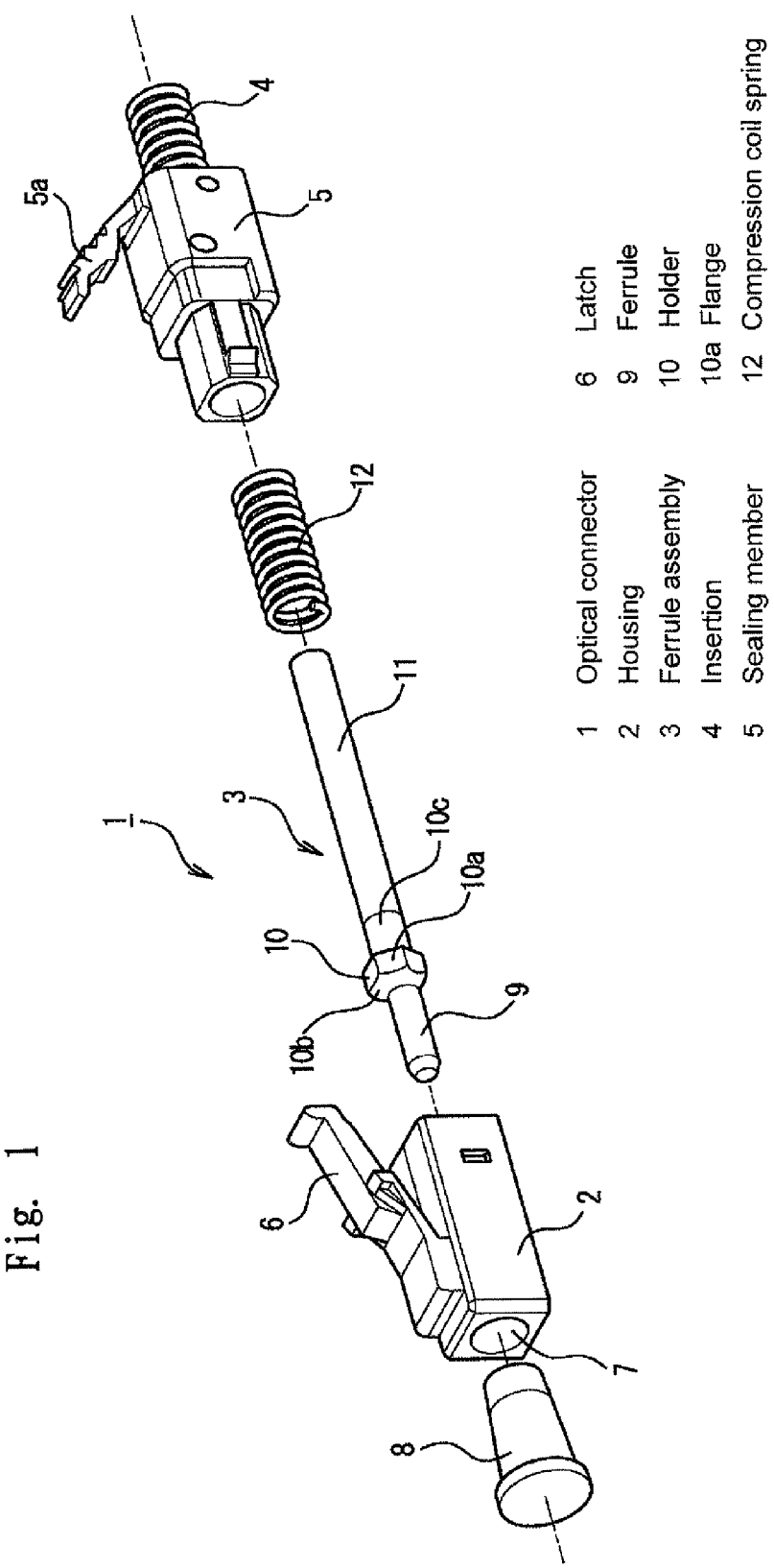
FIG. 1 is an exploded perspective view of an optical connector according to the present invention.

| EXPLANATION OF REFERENCE NUMERALS | |
|---|---|
| 1: | Optical connector |
| 2: | Housing |
| 3: | Ferrule assembly |
| 4: | Insertion |
| 5: | Sealing member |
| 6: | Latch |
| 9: | Ferrule |
| 10: | Holder |
| 10a: | Flange |
| 12: | Compression coil spring |
| 13: | Cavity |
| 14: | Recess |
| 14a: | Engaging portion |
| 14b: | Fitting portion |
| 14c: | Protrusion |

DESCRIPTION OF PREFERRED EMBODIMENT

Hereinafter, a preferred embodiment for working the present invention will be described with reference to the drawings.

Figure 2:
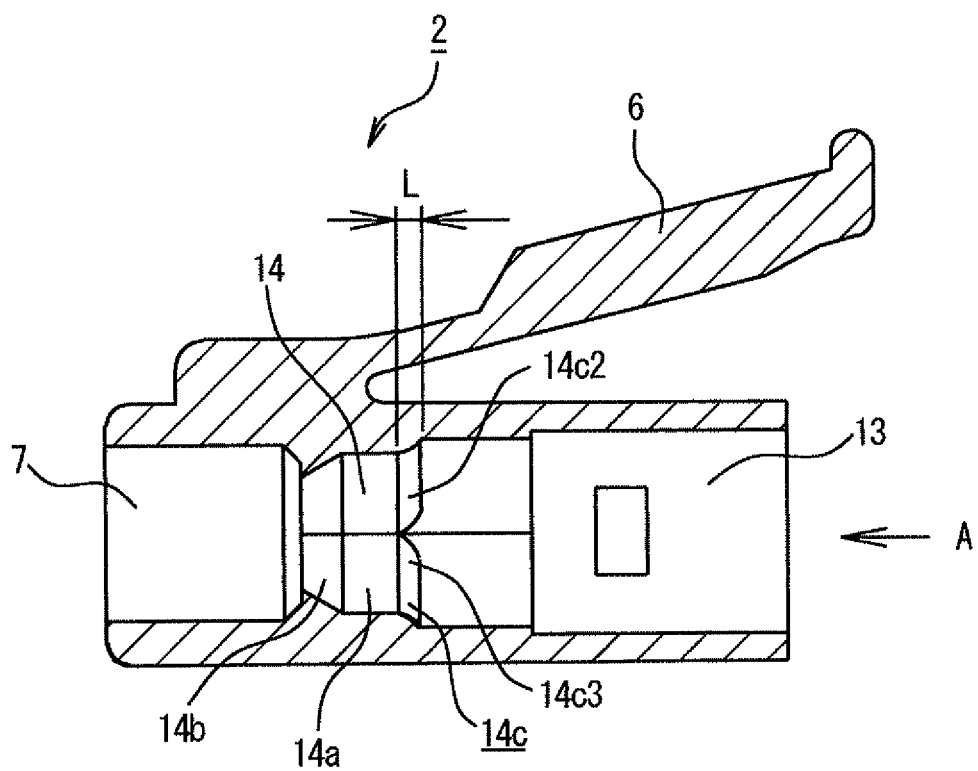
FIG. 2 is a vertical cross-sectional view of a housing of the optical connector according to the invention.
Figure 3:
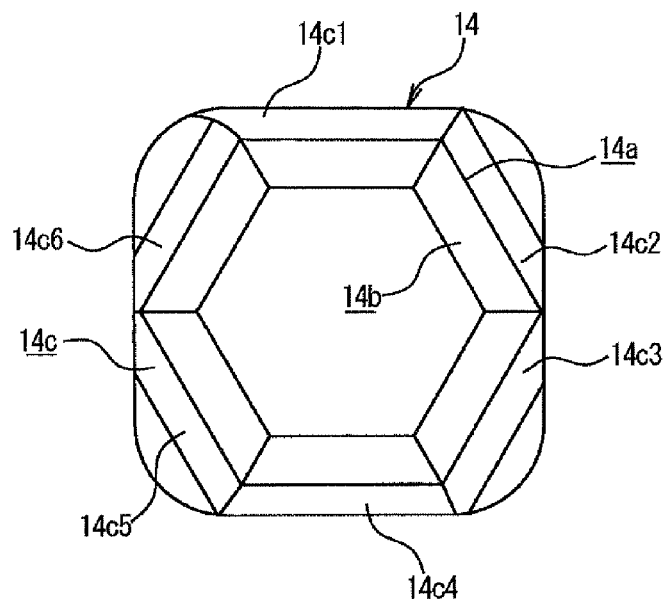
FIG. 3 is a view of the housing of the optical connector as viewed from the direction of arrow A in FIG. 2.
Figure 4:
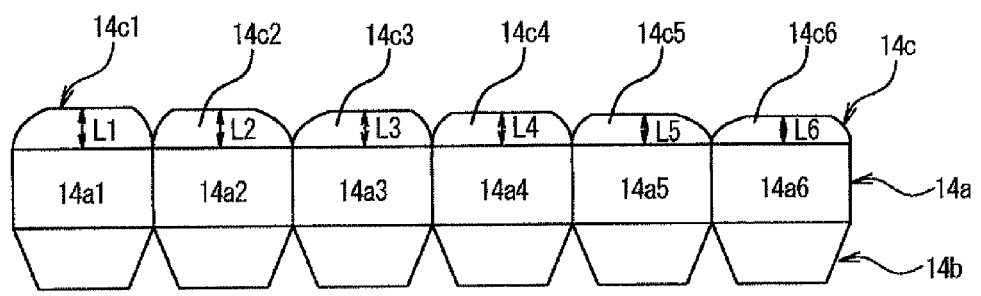
FIG. 4 is a schematic development view schematically showing a shape of a recess of the housing.
Figure 5A:
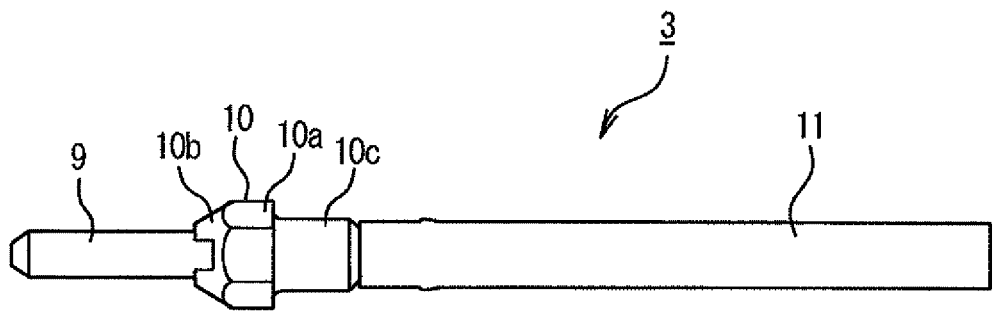
FIG. 5A is a side view of a ferrule assembly.
Figure 5B:
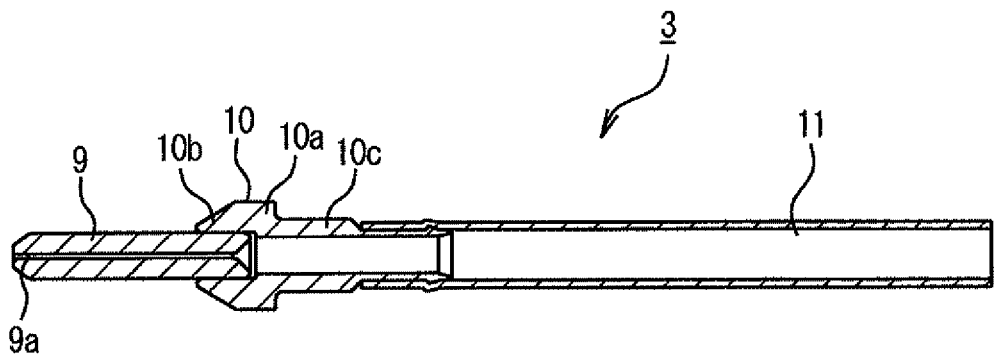
FIG. 5B is a vertical cross-section of the ferrule assembly.
Figure 6:
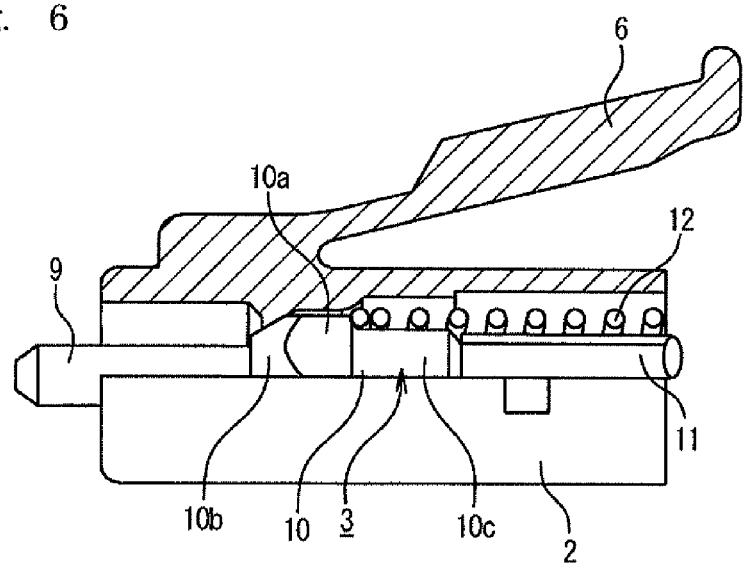
FIG. 6 is a partial vertical cross-sectional view showing a relationship between the housing and the ferrule assembly.
Figure 7:
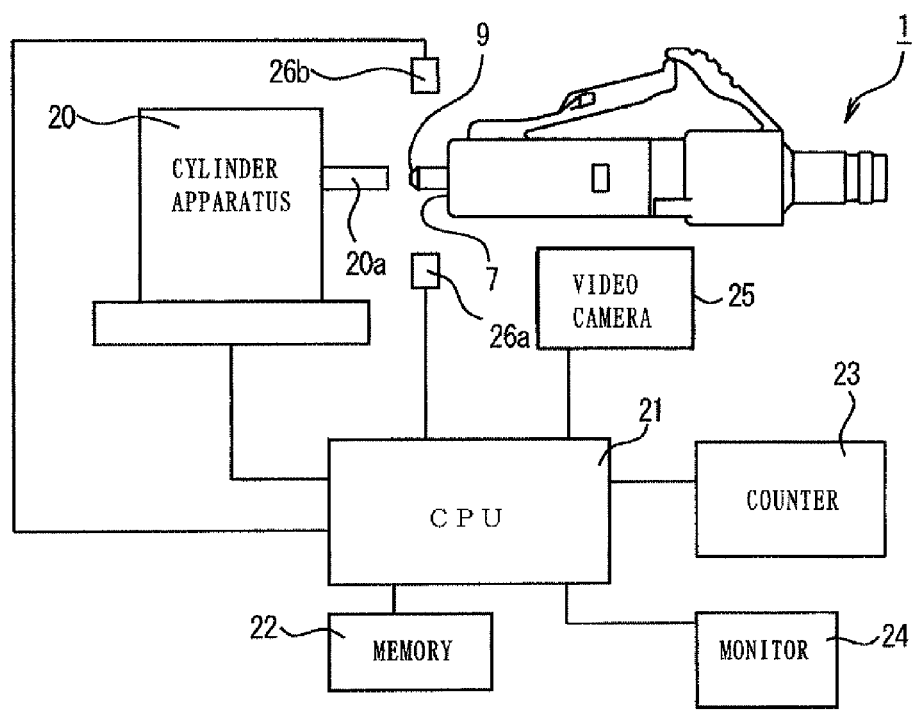
FIG. 7 is a schematic view of a pressing test apparatus.

FIG. 1 is an exploded perspective view of an optical connector according to the present invention, FIG. 2 is a vertical cross-sectional view of a housing of the optical connector according to the invention, FIG. 3 is a view as shown from the direction of arrow A in FIG. 2, FIG. 4 is a schematic development view explaining a shape of a recess, by spreading thereof, of the housing of the invention, FIGS. 5A and 5B are respectively a side view and a vertical cross-sectional view of a ferrule assembly, FIG. 6 is a partial vertical cross-sectional view showing a relationship between the housing and the ferrule assembly, and FIG. 7 is a schematic view of a pressing test apparatus.

As shown in FIG. 1, an optical connector 1 of the invention is comprised of a housing 2 which is a main body of equipment, a ferrule assembly 3 accommodated in the housing 2, an insertion 4 that guides the ferrule assembly 3, and a sealing member 5. The housing 2 and the sealing member 5 are made of a based material of a polyphenylsulfone (PPSU). A cavity 13 is formed inside the housing 2 (FIG. 2). On the housing 2, a latch 6 is integrally formed with the housing as cantilevered manner to project from the housing by providing a base anchor at a connection end side thereof. A dust cap 8 is removably mounted to an opening 7 where an optical connection end of the ferrule is located.

As shown in FIGS. 5A and 5B, a main body of the ferrule assembly 3 is comprised of a ferrule 9 and a holder 10 that firmly holds the ferrule 9. The ferrule 9 is formed from ceramics or zirconia by a known method such as injection molding. On the other hand, the holder 10 is made of stainless steel or brass. The ferrule 9 has a through-hole 9a for inserting an optical fiber in the axis direction thereof and is held to the holder 10 by means of press fitting or adhesive bonding. In the invention, the ferrule 9 is available to use any of a single mode ferrule and a multi mode ferrule. The ferrule 9 is formed into a cylindrical shape, and for example, may have an external diameter D of φ1.25 mm, a length L of 6.4 mm, and an internal diameter d of φ0.125 mm.

Figure 8:
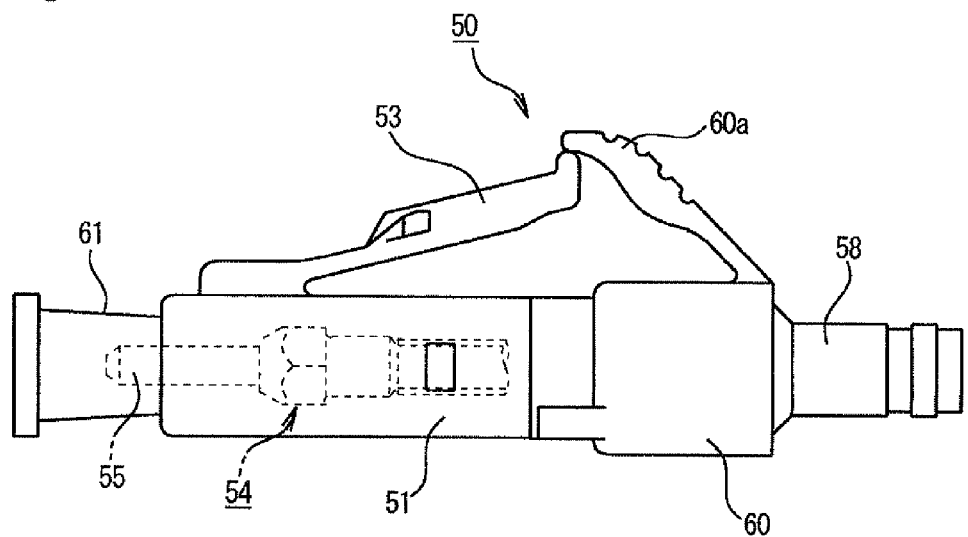
FIG. 8 is a plan view of a conventional optical connector.
Figure 9:
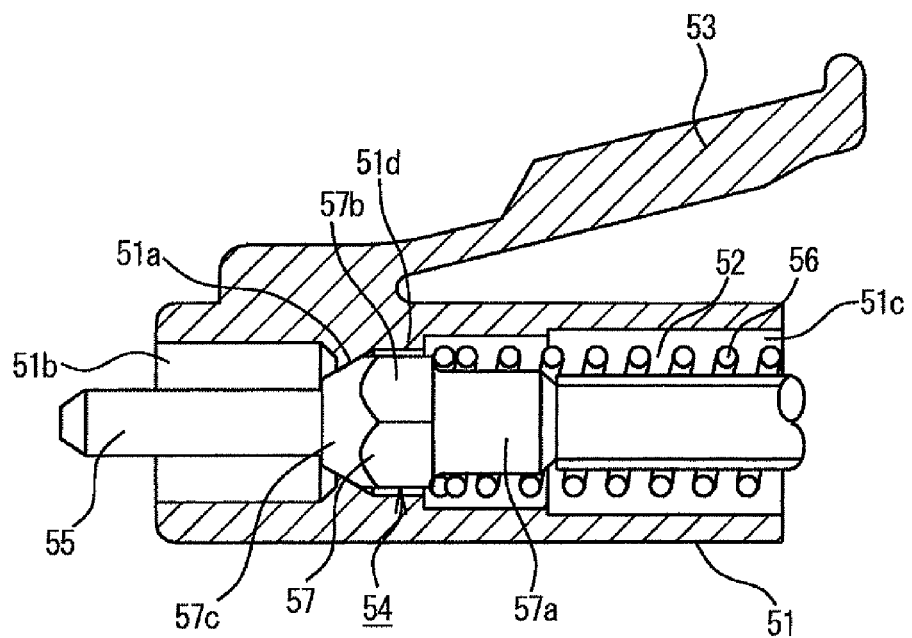
FIG. 9 is a vertical cross-sectional view showing a good assembly state of a conventional housing for an optical connector and a ferrule assembly.
Figure 10:
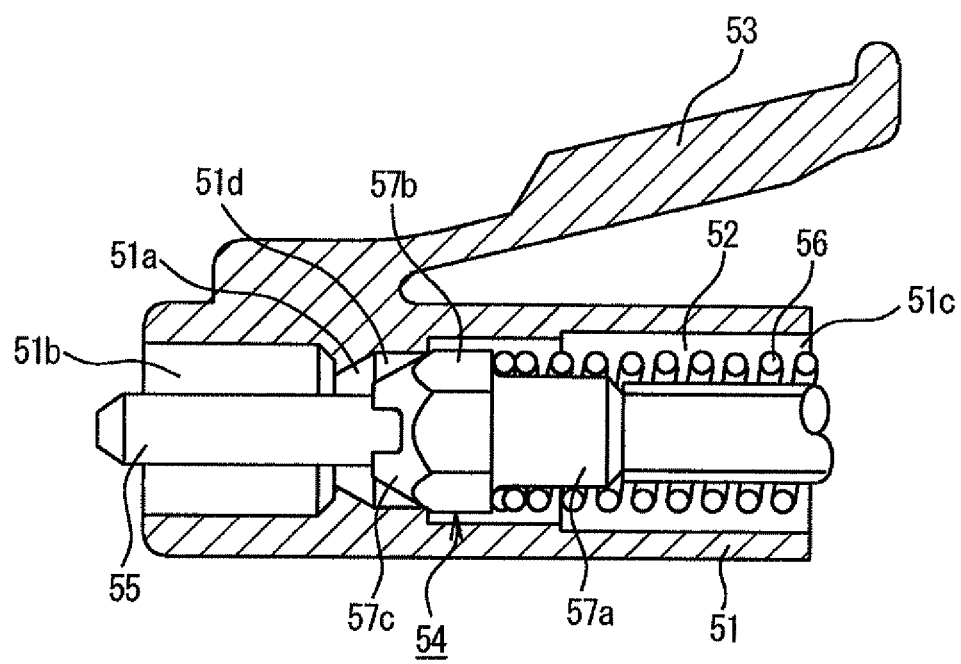
FIG. 10 is a vertical cross-sectional view showing a bad assembly state of the conventional housing and the ferrule assembly.

The holder 10 is provided with a guide sleeve 10c which is integrally formed on the rear end of a flange 10a of a hexagonal column shape to guide a compression coil spring, and a guide portion 10b of a shape of a frustum of a cone is integrally formed on the front end of the flange 10a. On the flange 10a of a hexagonal column shape in the holder 10, the distance between wall surfaces facing each other is specified as 2.54 mm. A flexible tube 11 is inserted and fitted to the guide sleeve 10c of the holder 10, and a compression coil spring 12 is mounted and fitted around the outer circumference of the tube 11. The ferrule assembly 3 is held in an elastically advanceable and retractable manner by the compression coil spring 12 in the cavity 13. The cylindrical insertion 4 is inserted from the rear end of the tube 11 and presses an end of the compression coil spring 12, and the sealing member 5 and the housing 2 are engaged with each other in the longitudinal direction, so that the ferrule assembly 3 is accommodated in the cavity 13, the end of the insertion 4 is projected from an end of the sealing member 5, and the optical connector is assembled in the same way as the conventional optical connector shown in FIG. 8. By this assembling, the ferrule assembly 3 is elastically accommodated in the cavity as shown in FIG. 6. By the engagement of the housing 2 and the sealing member 5, a front end of a trigger lever 5a of the sealing member 5 is positioned above the latch 6 of the housing 2.

The cylindrical cavity 13 is formed in the housing 2, and a recess 14 which has a shape corresponding to the shape of the holder 10 is formed between the cavity 13 and the opening 7 in which a forward end of the optically connected ferrule 9 is situated. Specifically, the recess 14 is provided with a fitting portion 14b, a shape of which is corresponded to the truncated cone shape of guide portion 10b, and the flange 10a of the hexagonal shape, and a hexagonal shaped engaging portion 14a which are adjacent to each other. Protrusion 14c (comprised of a plurality of protruding portions 14c1 to 14c6) is formed at each side edge of a plurality of wall portions 14a1 to 14a6 of the engaging portion 14a in the direction of inserting the ferrule assemble (i.e., from each side part or edge of the of the wall portions 14a1 to 14a6 toward the cavity 13). It is preferred that the plurality of the protruding portions 14c1 to 14c6 is formed to rise in a shape of curved surface. The boundary portions between the protrusion 14c and the wall portions of the engaging portion 14a, are smoothly connected, therefore, the ferrule assembly 3 can be easily and reliably inserted into and held in the housing 2. It is preferred that the shape of the curved surface of the each protruding portions are formed to have the same curvature radius R, and the radius R is preferred to be about 0.45 mm to 0.85 mm. As shown in FIGS. 3 and 4, each rising height L of the protruding portions 14c1 to 14c6 is preferred to be 0.24 mm to 0.51 mm to have the respectively varied and different heights thereof.

As schematically shown in FIG. 4, it is preferred that rising heights L1 to L6 of the adjacent protruding portions are formed such that the heights are successively lowered. For example, a rising height L1 of the protruding portion 14c1 is set to 0.45 mm, and a rising height L2 of the adjacent protruding portion 14c2 is set to 0.42 mm, and in the same way, from L3 to L6, the respective rising height thereof is successively lowered by 0.03 mm by changing a protruding amount. As a result, since the rising height L1 of the highest protruding portion 14c1 is 0.45 mm and the rising height L6 of the lowest protruding portion 14c6 is 0.30 mm, and the difference becomes 0.15 mm. In this way, by successive variation of the rising heights of the protruding portion adjacent to one another, the flange 10a of the ferrule assembly 3 is smoothly guided to the protrusion 14c, and the ferrule assembly 3 is rotated around the axis thereof and easily held in the recess 14.

As shown in FIG. 6, optical connection can be achieved by inserting the holder 10 into the recess 14 so that the flange 10a of the holder 10 is reliably engaged with the engaging portion 14a. However, if an insignificant eccentricity occurs, the engagement of the flange 10a and the engaging portion 14a is released, and the ferrule assembly 3 is rotated, and the flange 10a and the engaging portion 14a are engaged together again in a position where an optimal optical connection can be achieved.

In the example described above, a case in which the flange 10a of the holder 10 has a hexagonal column shape is described. However, the shape of the flange 10a may be a square prism-shape or other polygonal prism-shapes. It is understood that the shape of the flange is not limited to the shape described in the embodiment since the shape of the flange may be appropriately determined.

In addition, the curvature radius and the rising height of the protrusion of the invention can be properly changed in design by those skilled in the art, and are not limited to the values described above. Although an example is described in which the rising heights of the protruding portions adjacent to one another is changed in a stepwise manner, it is possible to form the protruding portions into a continuously spiral shape as a whole, in which the height is gradually lowered, by smoothly lowering the rising heights of the protruding portions.

Example

Three optical connectors (samples 1 to 3) of the present invention which have protruding portions formed so that the rising heights are lowered from 0.45 mm to 0.30 mm to be respectively and lowered 0.03 mm in order, and three conventional optical connectors (samples 4 to 6) which do not have protrusion are prepared. Then, the ferrule 9 is repeatedly pressed by a pressing test apparatus shown in FIG. 7, and whether or not the ferrule 9 returns to a correct position is tested.

The pressing test apparatus is entirely controlled by a controller (CPU) 21, and reciprocative movement is repetitively is given to the ferrule 9 by reciprocating a plunger 20a of a cylinder apparatus 20 being straight to the ferrule 9. When the ferrule 9 is pressed by the plunger 20a, the ferrule assembly 3 is evacuated in the opening 7 against the force of the compression coil spring described above. This evacuation operation becomes an adjustment operation of the eccentric position described above. The reciprocal movements of the ferrule 9 are detected by sensors 26a and 26b, and the movements are captured by a video camera 25 and displayed on a monitor 24. An output signal from the sensor 26 is measured by a counter 23 and the result is stored in a memory 22. In spite of evacuation of the ferule 9 after the projecting movement of the plunger 20*a*, if the ferrule 9 does not project to the original position by the elastic force of the compression coil spring, the sensor counts one error, i.e. 1 of the error.

The reciprocal movement of the plunger is performed 50 times for each sample by using the above-described measurement apparatus, and the number of errors was measured. The result is shown in table 1. As seen from the result in table 1, for the conventional optical connectors, the error occurs 9 times in the sample 4, 5 times in sample 5, and 7 times in the sample 6. On the other hand, for the optical connectors of the present invention, it is demonstrated that the error hardly occurs in any of the samples 1 to 3, and only one time error occurred in the sample 3. A large difference in stability when the ferrule assembly is contained into the housing is observed between the optical connector obtained by using the housing of the invention which includes protrusion in the cavity and the optical connector obtained by using a conventional housing which does not include protrusion.

TABLE 1

|  | Example (Present Invention) Protrusion: Existence | | | Comparative Example (Conventional Article) Protrusion: Nonexistence | | |
| --- | --- | --- | --- | --- | --- | --- |
|  | Sample 1 | Sample 2 | Sample 3 | Sample 4 | Sample 5 | Sample 6 |
| Number of times Counted Error: (In 50 Times of Operating Test) | 0 | 0 | 1 | 9 | 5 | 7 |

The invention claimed is:

1. A housing for an optical connector, comprising a cavity formed therein to accommodate and hold a ferrule assembly having a holder in the form of a polygonal prism-shape flange and for holding the ferrule assembly to be capable of elastically advancing and retracting thereof, the housing comprising:
    a polygonal engaging portion having a plurality of engaging walls provided in the cavity to receive and engage the flange of the ferrule assembly, and
    a protrusion provided at an end side of each of the plurality of engaging walls of the polygonal engaging portion in a direction of inserting the ferrule assembly therein to rise in an opening for inserting the ferrule assembly to guide the flange of the ferrule assembly, wherein the protrusion is comprised of a plurality of protruding portions having different rising heights from each other.

2. The housing for an optical connector according to claim 1, wherein each of the plurality of protruding portion rises in a state of a curved surface.

3. The housing for an optical connector according to claim 1, wherein each of the plurality of protruding portion rises to form a curved surface having a same curvature radius.

4. The housing for an optical connector according to claim 1, wherein the heights of the plurality of protruding portions which are adjacent to one another are formed to be lowered consecutively.

5. An optical connector characterized in that a ferrule assembly is held in a housing by fitting and engaging the flange of the ferrule assembly with the engaging portion of the housing for the optical connector according to claim 1.

6. The housing for an optical connector according to claim 2, wherein the heights of the plurality of protruding portions which are adjacent to one another are formed to be lowered consecutively.

7. The housing for an optical connector according to claim 1, wherein the heights of the plurality of protruding portions which are adjacent to one another are formed to be gradually varied.

8. The housing for an optical connector according to claim 1, wherein a boundary portion between the protrusion and engaging wall portion provided with the engaging portion is smoothly connected, and the ferrule assembly is easily and reliably inserted into and held in the housing.

9. The housing for an optical connector according to claim 1, wherein the heights of the plurality of protruding portions which are adjacent to one another are formed to be gradually varied, and the flange of the holder provided with the ferrule assembly which is inserted from the cavity of the housing is smoothly guided by the protrusion of the housing, and the ferrule assembly is rotated around the axis, and the flange is reliably engaged and held with the engaging portion provided to the recess.

10. The housing for an optical connector according to claim 1, where the plurality of protruding portions are formed into a continuously spiral shape as a whole to have the respective rising heights thereof being smoothly lowered.

11. The optical connector according to claim 5, wherein each of the plurality of protruding portions rises in a state of a curved surface.

12. The optical connector according to claim 5, wherein each of the plurality of protruding portions rises to form a curved surface having the same curvature radius.

13. The optical connector according to claim 5, wherein the heights of the plurality of protruding portions which are adjacent to one another are formed to be lowered consecutively.

14. The optical connector according to claim 11, wherein the heights of the plurality of protruding portions which are adjacent to one another are formed to be lowered consecutively.

15. The optical connector according to claim 5, wherein the heights of the plurality of protruding portions which are adjacent to one another are formed to be gradually varied.

16. The optical connector according to claim 5, wherein a boundary portion between the protrusion and the engaging wall portion provided with the engaging portion is smoothly connected, and the ferrule assembly is easily and reliably inserted into and held in the housing.

17. The optical connector according to claim 5, wherein the heights of the plurality of protruding portions which are adjacent to one another are formed to be gradually varied, and the flange of the holder provided with the ferrule assembly which is inserted from the cavity of the housing is smoothly guided by the protrusion of the housing, and the ferrule assembly is rotated around an axis, and the flange is reliably engaged and held with the engaging portion provided to a recess.

18. The optical connector according to claim 5, where the plurality of protruding portions are formed into a continuously spiral shape as a whole to have the respective rising heights thereof being smoothly lowered.

\* \* \* \* \*